(12) United States Patent
Minami et al.

(10) Patent No.: US 6,512,610 B1
(45) Date of Patent: Jan. 28, 2003

(54) DEVICE AND METHOD FOR TESTING OF MULTI-BRANCH OPTICAL NETWORK

(75) Inventors: Takao Minami, Tokyo (JP); Nobuaki Takeuchi, Tokyo (JP); Keiichi Shimizu, Osaka (JP); Koichi Shinozaki, Osaka (JP); Takamu Genji, Osaka (JP)

(73) Assignees: Ando Electric Co., Ltd., Tokyo (JP); The Kansai Electric Power Co., Inc., Osaka (JP)

( * ) Notice: Subject to any disclaimer, the term of this patent is extended or adjusted under 35 U.S.C. 154(b) by 0 days.

(21) Appl. No.: 09/261,835

(22) Filed: Mar. 3, 1999

(30) Foreign Application Priority Data

Mar. 11, 1998 (JP) .......................................... 10-060131

(51) Int. Cl.[7] .............................................. H04B 10/08

(52) U.S. Cl. ....................................... 359/110; 356/73.1

(58) Field of Search ......................................... 359/110

(56) References Cited

U.S. PATENT DOCUMENTS

| | | | | |
|---|---|---|---|---|
| 5,383,015 A | * | 1/1995 | Grimes | 356/73.1 |
| 6,028,661 A | * | 2/2000 | Minami et al. | 356/73.1 |
| 6,185,020 B1 | * | 2/2001 | Horiuchi et al. | 359/110 |
| 6,310,702 B1 | * | 10/2001 | Minami et al. | 356/73 |

OTHER PUBLICATIONS 1.6 $\mu$m–band Fault Isolation Technique For Passive Double Star Networks, Institute of Electronics, Information and Communication Engineers of Japan, 1994.

\* cited by examiner

Primary Examiner—Jason Chan
Assistant Examiner—Tuanson Huynh
(74) Attorney, Agent, or Firm—Darby & Darby

(57) ABSTRACT

A multi-branch optical network testing method (or device) is provided to perform a fault isolation test on an optical network that branches off at a branch point by a number of optical lines having terminal ends respectively. Herein, optical pulses are input to the optical network, from which they are returned as reflection beams. Then, response beams corresponding to mixture of the reflection beams are converted to OTDR waveform data representing a waveform whose optical power gradually decreases in accordance with a distance from an OTDR measurement device and which has a number of reflection peaks. The OTDR waveform data are subjected to logarithmic conversion to produce logarithmic waveform data representing a logarithmic waveform. An approximation method of least squares is effected on the logarithmic waveform data to produce an approximation line, which crosses the logarithmic waveform at points of intersection corresponding to Fresnel reflection points. Using the Fresnel reflection points as split points to split the OTDR waveform data into a number of ranges. Attenuation constants are repeatedly calculated with respect to each of the ranges every measurement time and are stored in a storage device. Thereafter, fault determination is automatically performed based on the attenuation constants stored in the storage device with respect to the fault occurrence time, fault occurrence line and fault occurrence distance.

12 Claims, 11 Drawing Sheets

FIG.5

| BEFORE FAULT OCCURRENCE | | DETERMINATION |
|---|---|---|
| RANGE | ATTENUATION CONSTANT | |
| L4 | $\alpha 4$ | TERMINAL END OF FIBER FB4: ED4 |
| L3 | $\alpha 3, \alpha 4$ | TERMINAL END OF FIBER FB3: ED3 |
| L2 | $\alpha 2, \alpha 3, \alpha 4$ | TERMINAL END OF FIBER FB2: ED2 |
| L1 | $\alpha 1, \alpha 2, \alpha 3, \alpha 4$ | TERMINAL END OF FIBER FB1: ED1 |

FIG.9

| AFTER FAULT OCCURRENCE | | DETERMINATION |
|---|---|---|
| RANGE | ATTENUATION CONSTANT | |
| L4' | α4 | TERMINAL END OF FIBER FB4: ED4 |
| L3' | α2, α4 | TERMINAL END OF FIBER FB2: ED2 |
| L2' | α1, α2, α4 | TERMINAL END OF FIBER FB1: ED1 |
| L1' | α3, α1, α2, α4 | TERMINAL END OF FIBER FB3: ED3' |

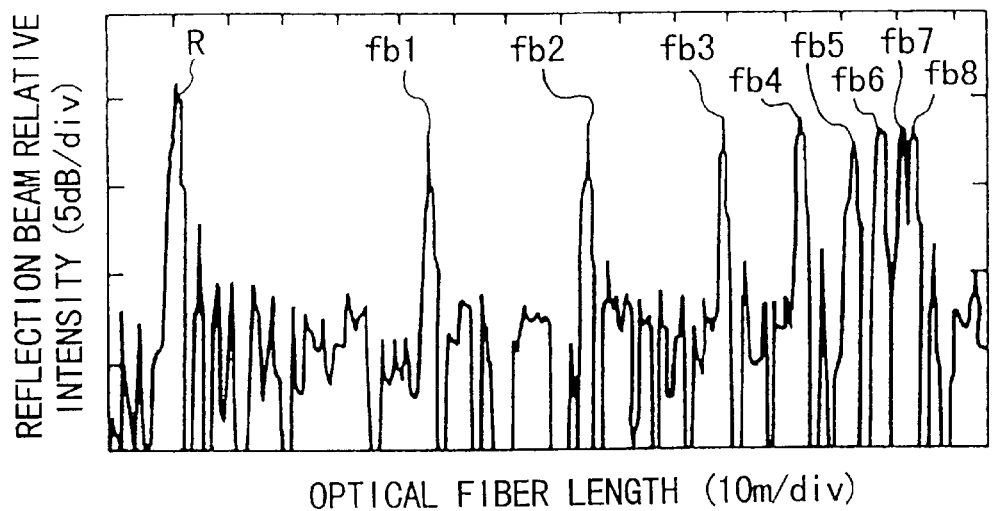
FIG. 11
(Prior Art)
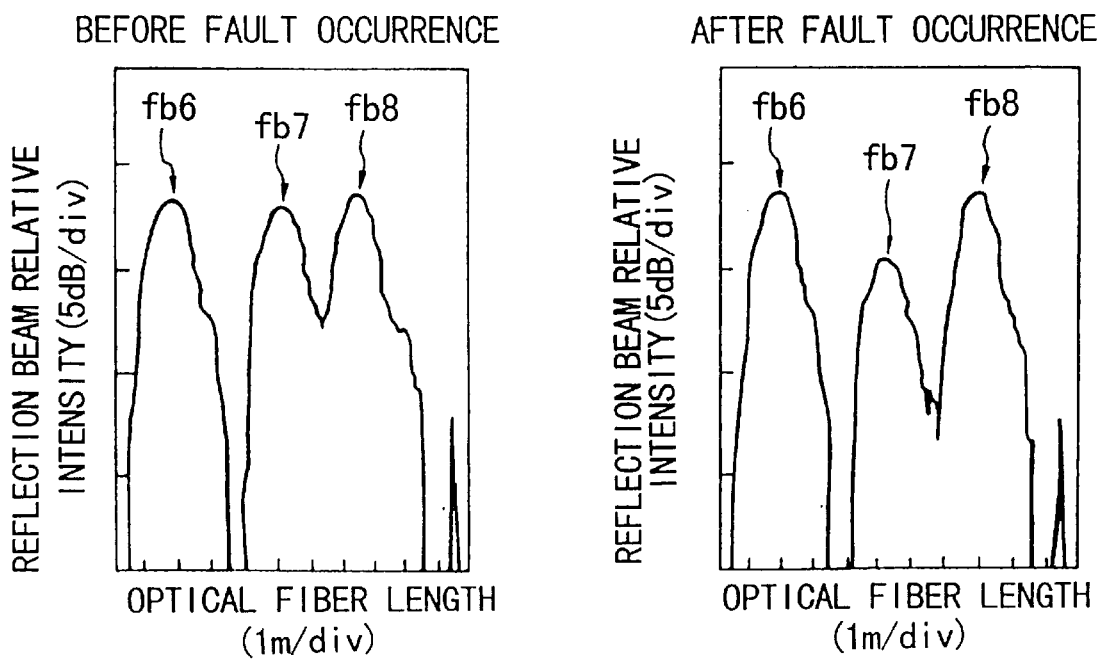
FIG. 12A
(Prior Art)
FIG. 12B
(Prior Art)

DEVICE AND METHOD FOR TESTING OF MULTI-BRANCH OPTICAL NETWORK

BACKGROUND OF THE INVENTION

1. Field of the Invention

This invention relates to devices and methods that use OTDR measurement for testing of multi-branch optical networks which branch off by optical lines.

This application is based on Patent Application No. Hei 10-60131 filed in Japan, the content of which is incorporated herein by reference.

2. Description of the Related Art

FIG. 10 is a block diagram showing an example of a system configuration for a multi-branch optical network testing device, which is conventionally known. The multi-branch optical network testing device of FIG. 1 is designed to perform a fault isolation test on an optical network of eight-branch type, which is provided in a 1.31/1.55 wavelengths multiplex transmission system. In FIG. 1, an OTDR measurement device 1 (where "OTDR" is an abbreviation for "Optical Time Domain Reflectometer") outputs test beams of 1.6 μm band, which are incident on an optical line 3 via an optical coupler 2. Then, the test beams branch out by a star coupler 4, from which they are distributed to optical fibers fb1 to fb8 respectively.

The optical fibers fb1 to fb8 are respectively connected to ONUs (i.e., Optical Network Unit or Subscriber Network Device). On the optical fibers fb1 to fb8, filters 41 to 48 are provided prior to the ONUs respectively. Each of the filters 41 to 48 has a band-pass characteristic in which only a signal beam corresponding to each of the ONUs is allowed to pass therethrough while the test beam is reflected thereby. Therefore, the test beams propagating through the optical fibers fb1 to fb8 are respectively reflected by the filters 41 to 48, so that reflected test beams (simply called reflection beams) propagate backwardly through the optical fibers 41 to 48 respectively. Those reflection beams are subjected to wave mixing while being passed through the star coupler 4, which thus produces response beams. Then, the response beams are returned to the OTDR measurement device 1. Thus, the OTDR measurement device 1 analyzes the response beams.

FIG. 11 is a graph showing an example of waveforms of the response beams which are observed by the OTDR measurement device 1. The waveforms show time-series variations of the response beams. In FIG. 11, a horizontal axis represents a value which is produced by multiplying propagation time of the response beam by transmission speed of light, that is, a length of the optical fiber that the response beam propagates through.

The response beams are produced by mixing the reflection beams reflected by the filters 41 to 48 respectively. Those filters are located at different positions on the optical fibers fb1 to fb8 with different distances from the OTDR measurement device 1 respectively. For this reason, the reflection beams, which are reflected by the filters 41 to 48 respectively and which are observed by the OTDR measurement device 1, do not overlap with each other on the time axis, so they are observed in a separate way. A waveform R shown in a leftmost area of the graph of FIG. 11 corresponds to a reflection beam from the star coupler 4. Waveforms, which follow the waveform R and which are sequentially arranged in the graph from the left to the right, correspond to the reflection beams which are respectively reflected by the optical fibers fb1 to fb8 and which are returned to the OTDR measurement device 1.

FIG. 12A and FIG. 12B are graphs showing magnified images of waveforms of the response beams corresponding to the reflection beams which are output from the optical fibers fb6 to fb8 respectively and are observed by the OTDR measurement device 1.

The graph of FIG. 12A is made with respect to a non-fault situation where no fault occurs on any of the optical fibers fb6 to fb8, while the graph of FIG. 12B is made with respect to a fault situation where a fault is simulated by imparting a bend loss of 3 dB to the optical fiber fb7.

It is understood from the graphs that reduction occurs in intensity of the reflection beam with regard to the optical fiber fb7 on which a fault is simulated.

According to the system configuration shown in FIG. 10, it is possible to detect the fault that occurs on the optical network by analyzing intensities of the reflection beams corresponding to the response beams returned to the OTDR measurement device 1.

Incidentally, the aforementioned technology is disclosed by the paper B-846 entitled "1.6 μm-band Fault Isolation Technique For Passive Double Star Networks", which is issued in 1994 autumn meeting of the Institute of Electronics, Information and Communication Engineers of Japan.

However, the aforementioned multi-branch optical network testing device suffers from problems as follows:

i) The aforementioned multi-branch optical network testing device is capable of specifying the optical line on which the fault occurs. However, it is impossible to detect a distance of a fault occurrence point (or position) on the optical line.

ii) The multi-branch optical network testing device requires the facilities that the filters are arranged respectively on the "branched" optical fibers at different positions by which intervals of distance measured from the coupler and filters differ from each other. This brings a limitation in fiber lengths.

iii) The multi-branch optical network testing device requires the optical fibers to have filters respectively. This requires high cost for construction of the system.

SUMMARY OF THE INVENTION

It is an object of the invention to provide a multi-branch optical network testing method and a multi-branch optical network testing device, which are capable of automatically detecting fault occurrence times, fault occurrence lines and fault occurrence distances with regard to multi-branch optical networks.

A multi-branch optical network testing method (or device) of this invention is provided to perform a fault isolation test on an optical network that branches off at a branch point (e.g., optical coupler) by a number of optical lines having terminal ends respectively. Herein, optical pulses are input to the optical network, from which they are returned as reflection beams. Then, response beams corresponding to mixture of the reflection beams are converted to OTDR waveform data representing a waveform whose optical power gradually decreases in accordance with a distance from an OTDR measurement device and which has a number of reflection peaks.

The OTDR waveform data are subjected to logarithmic conversion to produce logarithmic waveform data representing a logarithmic waveform. An approximation method of least squares is effected on the logarithmic waveform data to produce an approximation line, which crosses the logarithmic waveform at points of intersection corresponding to Fresnel reflection points. Using the Fresnel reflection points as split points to split the OTDR waveform data into a number of ranges. Attenuation constants are repeatedly calculated with respect to each of the ranges every measurement time and are stored in a storage device.

Thereafter, fault determination is automatically performed based on the attenuation constants stored in the storage device with respect to the fault occurrence time, fault occurrence line and fault occurrence distance. Herein, the fault determination is made in response to a change that occurs between the attenuation constants sequentially calculated at the consecutive measurement times with respect to each of the ranges.

BRIEF DESCRIPTION OF THE DRAWINGS

These and other objects, aspects and embodiment of the present invention will be described in more detail with reference to the following drawing figures, of which:

FIG. 5 shows an example of relationships between attenuation constants and determination of points with respect to the non-fault situation;

FIG. 9 shows an example of relationships between attenuation constants and determination of points with respect to the fault situation;

FIG. 11 is a graph showing waveforms of response beams which are observed by an OTDR measurement device of the multi-branch optical network testing device shown in FIG. 10;

FIG. 12A is a graph showing magnified images of waveforms regarding reflection beams that are produced by selected optical fibers with respect to the non-fault situation; and FIG. 12B is a graph showing magnified images of waveforms regarding reflection beams that are produced by selected optical fibers with respect to the fault situation where a fault occurs on one of the optical fibers.

DESCRIPTION OF THE PREFERRED EMBODIMENT

This invention will be described in further detail by way of examples with reference to the accompanying drawings.

Figure 1:
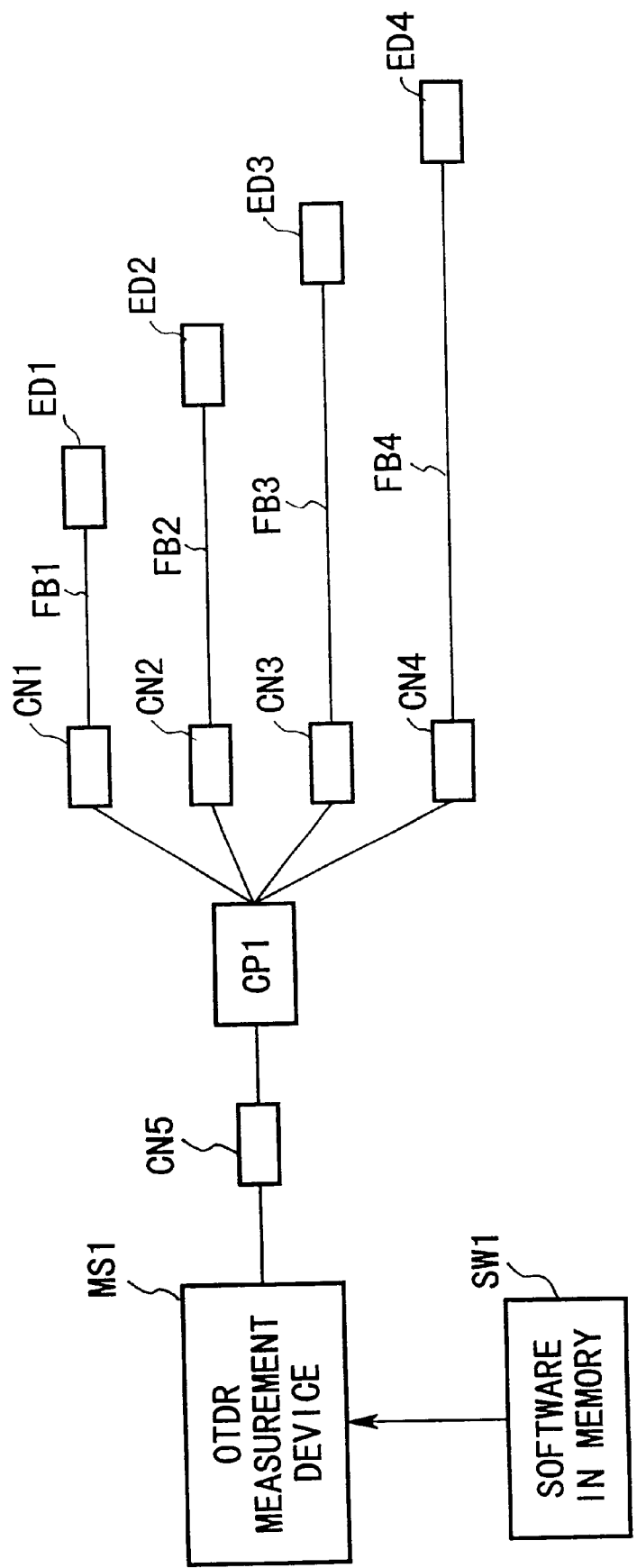
FIG. 1 is a block diagram showing a system configuration for a multi-branch optical network testing device in accordance with embodiment of the invention.

FIG. 1 is a block diagram showing a system configuration for a multi-branch optical network testing device in accordance with embodiment of the invention.

In FIG. 1, an OTDR measurement device MS1 is coupled with a software in memory "SW1" storing software programs for data analysis. In addition, branch optical fibers FB1 to FB4 are respectively connected to terminal ends ED1 to ED4. Connectors CN1 to CN4 are provided to establish connections between an optical coupler CP1 and the branch optical fibers FB1 to FB4. Further, the OTDR measurement device 1 is connected to the optical coupler CP1 by means of a connector CN5.

The multi-branch optical network testing device of the present embodiment deals with test subjects such as the optical coupler CP1, branch optical fibers FB1 to FB4 and terminal ends ED1 to ED4. So, the multi-branch optical network testing device is mainly configured by the OTDR measurement device MS1, connected with the aforementioned test subjects via the optical coupler CP1, and the software in memory SW1 storing the software programs that the OTDR measurement device MS1 performs.

In addition, the multi-branch optical network testing device is equipped with a large-scale storage device (e.g., hard-disk drive; not shown in FIG. 1), which stores measurement results produced by the OTDR measurement device MS1.

Next, operations of the multi-branch optical network testing device of FIG. 1 will be described mainly with regard to two kinds of operations, i.e., "(1) Creation of OTDR waveform data" and "(2) Waveform Analysis"

(1) Creation of OTDR Waveform Data

The OTDR measurement device MS1 outputs optical pulses, which are divided by the optical coupler CP1 and are incident on the branch optical fibers FB1 to FB4 respectively. Then, backscattering beams are caused to occur in the branch optical fibers FB1 to FB4 and are mixed together by the optical coupler CP1, which in turn outputs response beams. The response beams are returned to the OTDR measurement device MS1. In the OTDR measurement device MS1, the response beams are converted to electric signals in response to levels thereof. Then, the electric signals are stored in a memory (not shown) as OTDR waveform data (or digital waveform data).

Figure 2:
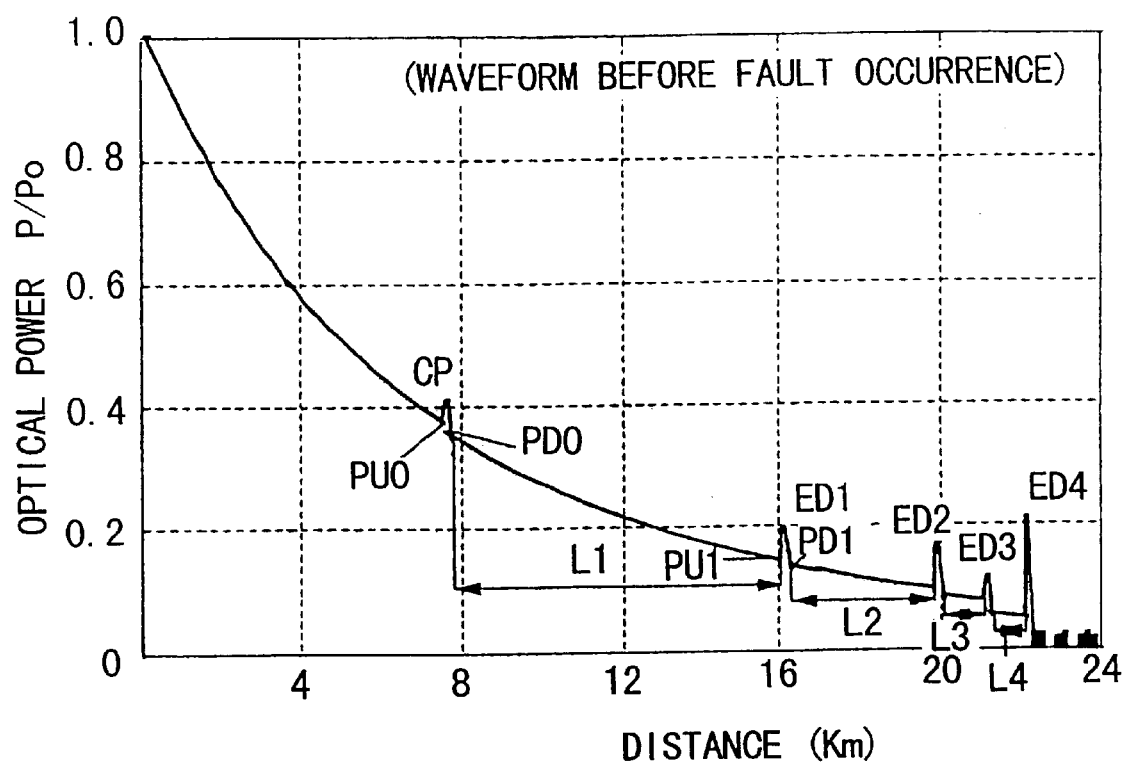
FIG. 2 is a graph showing an example of a waveform corresponding to OTDR waveform data which are collected with respect to the non-fault situation where no fault occurs on any of branch optical fibers shown in FIG. 1 at all.

FIG. 2 is a graph showing an example of a waveform representing the OTDR waveform data which are created with respect to the non-fault situation where no fault occurs on any of the branch optical fibers at all. In FIG. 2, a horizontal axis represents distance, in which the data are collected every measurement point corresponding to a distance of 2 m, for example. So, 20000 points correspond to 40 km (=2 m×20000). In addition, a vertical axis of FIG. 2 shows level of the backscattering beam detected for each of the branch optical fibers FB1 to FB4. Incidentally, the OTDR waveform data are created based on the backscattering beams of the branch optical fibers FB1 to FB4 which are mixed together. In FIG. 2, reference symbols "ED1" to "ED4" designate reflection peak waveforms in connection with the terminal ends ED1 to ED4 of the branch optical fibers FB1 to FB4. In addition, "CP" designates a reflection peak waveform in connection with the optical coupler CP1 to which the branch optical fibers FB1 to FB4 are connected.

(2) Waveform Analysis

Figure 3:
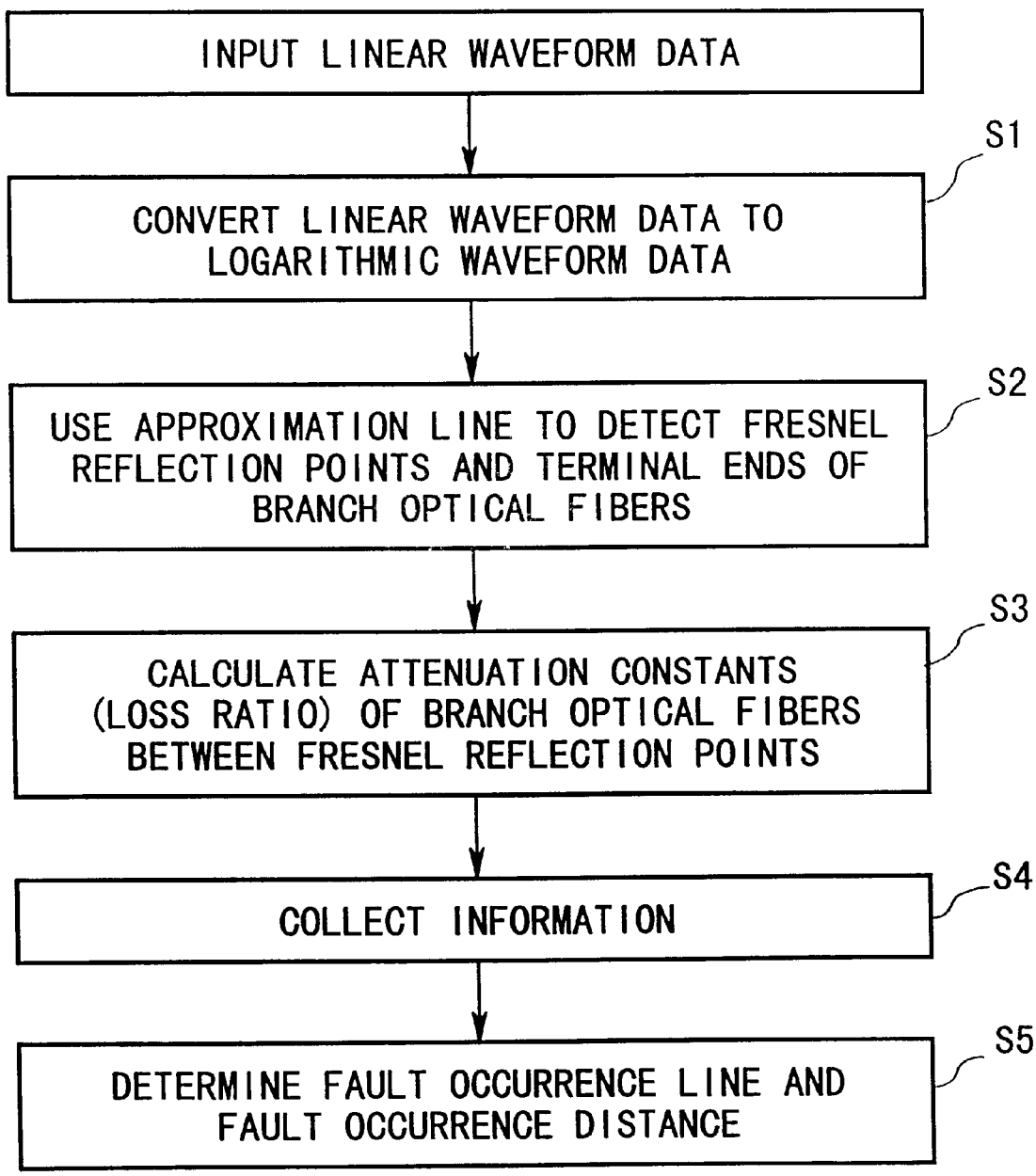
FIG. 3 is a flowchart showing an example of an analysis process for analyzing the OTDR waveform data.

FIG. 3 is a flowchart showing an example of an analysis process for analyzing the OTDR waveform data by the testing device of the present embodiment.

In step S1, the testing device converts the OTDR waveform data (or linear waveform data shown as the waveform of FIG. 2) to logarithmic waveform data.

In the present embodiment, conversion to the logarithmic waveform data is represented by an equation (1) as follows:

$$y_n = 5 \log (x_n) \quad (1)$$

Herein, "$x_n$" represents level (or optical power) of backscattering light received by the OTDR measurement device MS1, while a suffix "$_n$" added to "x" designates a number of the point (where n=1, 2, 3, ..., 20000) which is arranged with respect to the horizontal axis of the graph of FIG. 2. For example, $x_1$ designate level of the backscattering light detected with respect to a point of 2 m (=2 m×1), while $x_{20000}$ designates level of the backscattering light detected with respect to a point of 40 km (=2 m×20000).

Figure 4:
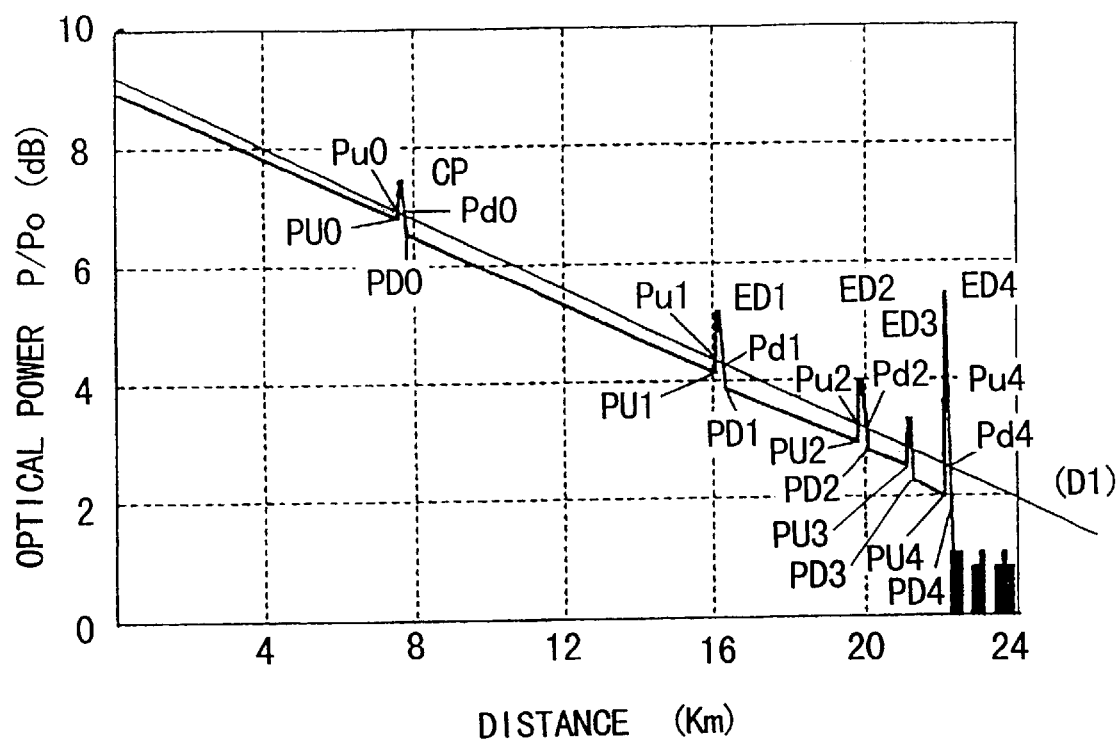
FIG. 4 is a graph showing an example of a logarithmic waveform corresponding to logarithmic waveform data produced based on the OTDR waveform data shown in FIG. 2 with respect to the non-fault situation.

So, there are provided 20000 of the linear waveform data $x_n$, which are converted to 20000 of the logarithmic data $y_n$ respectively in accordance with the aforementioned equation (1). FIG. 4 is a graph showing a logarithmic waveform which is drawn based on the logarithmic waveform data produced by converting the linear waveform data shown in FIG. 2.

In step S2, the testing device uses an approximation method of least squares on the logarithmic waveform data to create an approximation line, which is represented by an equation of "y=a1·d+b1" (see line D1 shown in FIG. 4). Herein, the testing device calculates constants a1 and b1 for the equation.

In FIG. 4, the approximation line D1 crosses the logarithmic waveform at points Pu0, Pd0, Pu1, Pd1, ..., Pu4 and Pd4. So, the testing device calculates distances with respect to those points of intersection to produce d(Pu0), d(Pd0), ..., d(Pd4). Then, based on the distances d(Pu0) and d(Pd0), for example, the testing device calculates a distance between a leading point PU0 and a trailing point PD0 with respect to the reflection peak CP. Similarly, the testing device calculates distances between leading points PU1–PU4 and trailing points PD1–PD4 with respect to the reflection peaks ED1 to ED4 respectively.

In step S3, the testing device uses the aforementioned reflection peaks (corresponding to Fresnel reflection points) as split points to split the OTDR waveform data shown in FIG. 2.

In the present embodiment, the testing device splits the OTDR waveform data of FIG. 2 into four ranges as follows:

L1: a range between the points PD0 and PU1;
L2: a range between the points PD1 and PU2;
L3: a range between the points PD2 and PU3: and
L4: a range between the points PD3 and PU4.

After effecting the split operation described above, the testing device performs separative analysis to calculate attenuation constants with respect to the aforementioned ranges L1 to L4 respectively. FIG. 5 shows an example of relationships between the attenuation constants and determination of points with respect to the non-fault situation where no fault occurs on any of the branch optical fibers FB1 to FB4 at all.

In step S4, the testing device stores the attenuation constants, which are calculated in the foregoing step S3, in the storage device (not shown) which is provided to store measurement results.

A series of the steps S1 to S4 are repeated every prescribed time. In the present embodiment, the testing device performs measurement once every prescribed time, wherein measurement times are denoted as $t_1, t_2, \ldots, t_k, t_{k+1}, t_{k+2}, \ldots$ The attenuation constants are measured at the measurement times respectively. So, the measurement times together with the attenuation constants are stored in the storage device.

Now, suppose a fault situation (see FIG. 6) where a fault occurs at a point "x" on the branch optical fiber FB3 at the time $t_{k+1}$.

Figure 7:
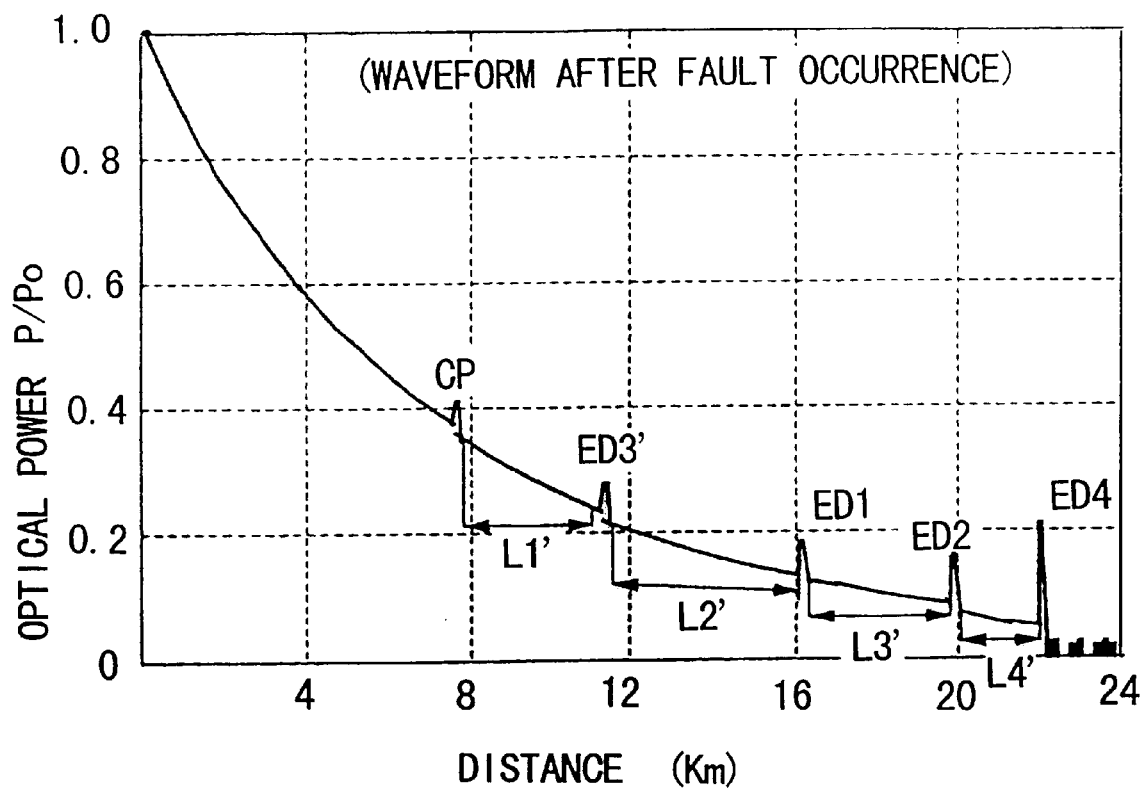
FIG. 7 is a graph showing an example of a waveform corresponding to OTDR waveform data which are collected with respect to the fault situation.

In this case, the OTDR waveform data input to the OTDR measurement device MS1 change in waveform from the aforementioned waveform of FIG. 2 to a waveform shown in FIG. 7. In FIG. 7, ED3' designates a waveform of a reflection peak at the point "x" on the optical fiber FB3.

Figure 8:
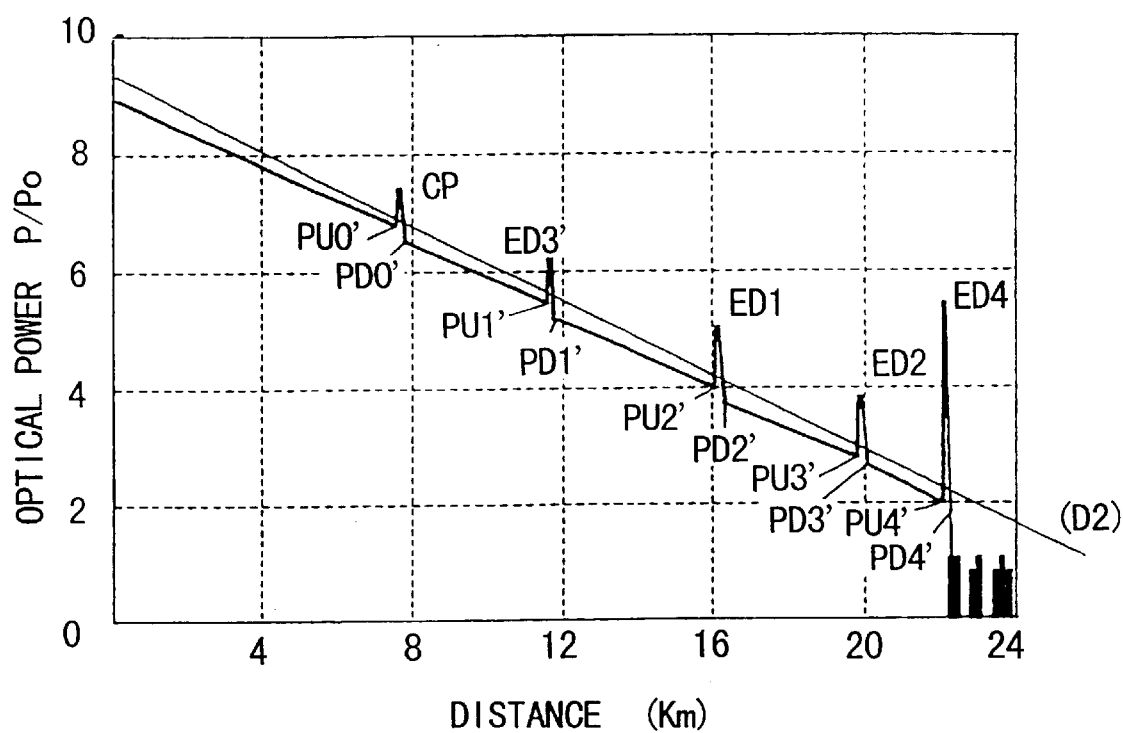
FIG. 8 is a graph showing an example of a logarithmic waveform corresponding to logarithmic waveform data produced based on the OTDR waveform data shown in FIG. 7 with respect to the fault situation.
Figure 10:
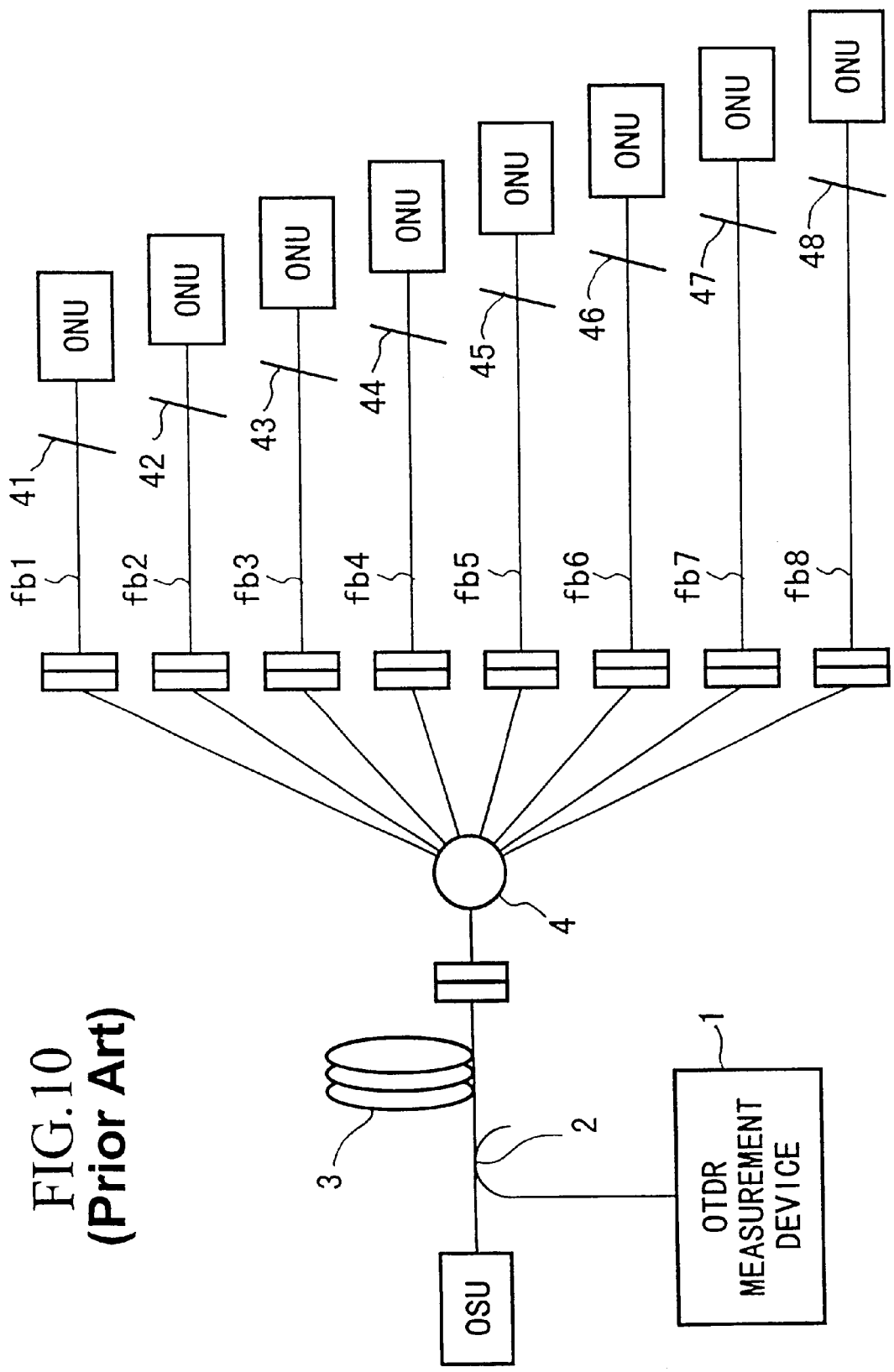
FIG. 10 is a block diagram showing an example of a system configuration for the multi-branch optical network testing device conventionally known.

After the OTDR waveform data shown in FIG. 7 are input to the OTDR measurement device MS1, the testing device proceeds to step S1 shown in FIG. 3, wherein the OTDR waveform data (or linear waveform data) are converted to logarithmic waveform data shown in FIG. 8.

In step S2, the testing device uses the approximation method of least squares on the logarithmic waveform data of FIG. 8 to provide an approximation line represented by an equation of "y=a2·d+b2" (see line D2 shown in FIG. 8). Thus, the testing device calculates constants a2 and b2 for the above equation.

Thereafter, as similar to the aforementioned calculations which are performed with respect to the non-fault situation, the testing device performs calculations to produce distances between leading points PU0'–PU4' and trailing points PD0'–PD4' with respect to the reflection peaks CP, ED3', ED1, ED2 and ED4 respectively.

In step S3, the testing device uses the aforementioned reflection peaks (corresponding to Fresnel reflection points) as split points to split the OTDR waveform data of FIG. 7 into four ranges L1' to L4'. So, the testing device performs separative analysis to produce attenuation constants with respect to the ranges L1' to L4' respectively. FIG. 9 shows an example of relationships between the attenuation constants and determination of points with regard to the fault situation where the fault occurs on the branch optical fiber FB3.

In step S4, the attenuation constants calculated in the step S3 are stored in the storage device as measurement results at the measurement time $t_{k+1}$.

Thus, the steps S1 to S4 are repeated, so that the storage device stores the attenuation constants (see FIG. 5) at the measurement times $t_1$ to $t_k$ as well as the attenuation constants (see FIG. 9) at the measurement time $t_{k+1}$.

After completion of the steps S1 to S4, the testing device proceeds to step S5, wherein the testing device performs a fault determination process to determine a set of fault occurrence time, fault occurrence line and fault occurrence distance based on the attenuation constants stored in the storage device.

Figure 6:
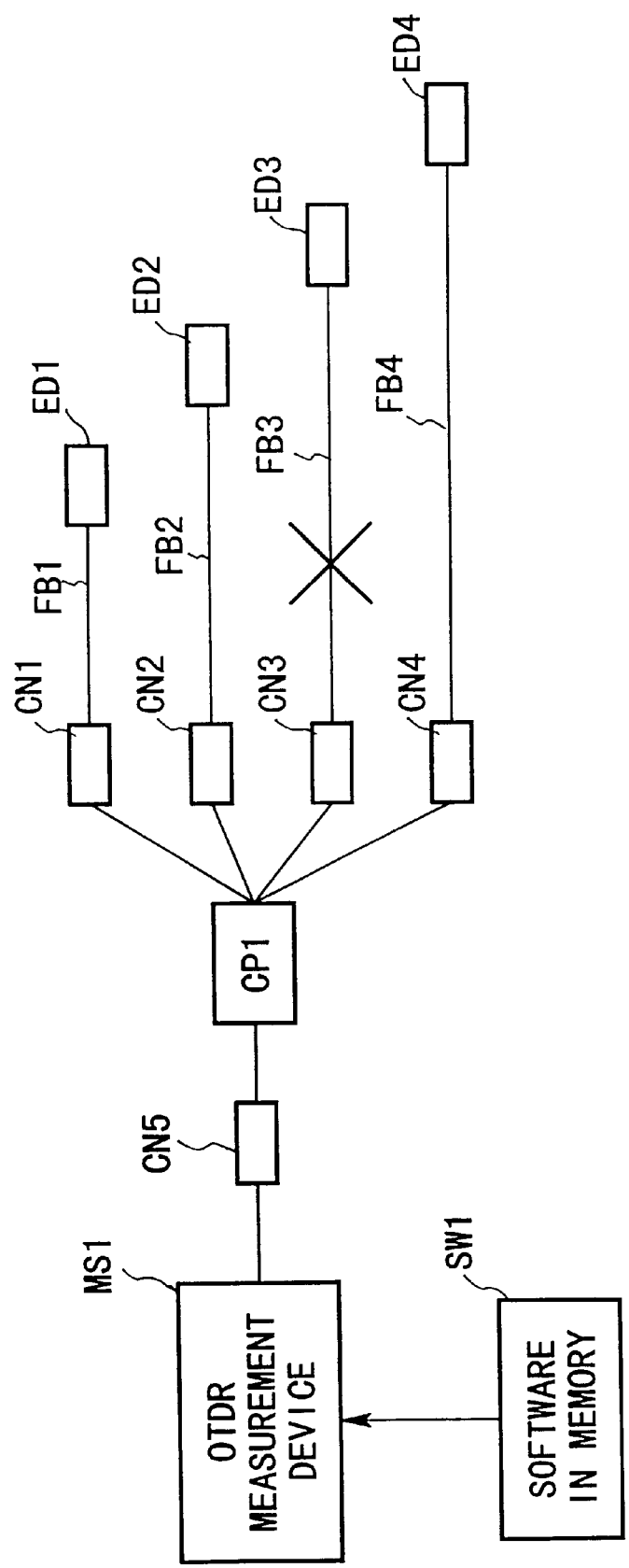
FIG. 6 is a block diagram showing a fault situation where a fault occurs on a branch optical fiber in the optical network.

Now, such a fault determination process will be described in detail with regard to the fault situation where as shown in FIG. 6, a fault occurs at the point "x" on the branch optical fiber FB3 at the time $t_{k+1}$. In this case, the attenuation constants shown in FIG. 5 are unchanged in the duration between the times $t_1$ and $t_k$. So, the testing device determines that no fault occurs in that duration. In the next duration between the times $t_k$ and $t_{k+1}$, changes occur such that the attenuation constants are changed from FIG. 5 to FIG. 9. So, the testing device determines that a fault occurs on the optical network. Herein, such changes of the attenuation constants occur in the duration between the times $t_k$ and $t_{k+1}$. So, the testing device determines that the fault occurs in that duration. Then, the testing device determines the branch optical fiber FB3 whose reflection peak shifts in position as the fault occurrence line. In addition, the testing device determines the distance corresponding to the reflection peak ED3' as the fault occurrence distance.

As described above, the multi-branch optical network testing device of the present embodiment is capable of automatically detecting the fault occurrence time, fault occurrence line and fault occurrence distance.

The aforementioned description is given with respect to the embodiment with reference to the accompanying drawings. However, the concrete system configuration applicable to this invention is not limited to the aforementioned system configuration described in the embodiment. So, changes or modifications in system configuration and design which do not depart from the subject matter of this invention can be contained within the scope of the invention.

In the aforementioned embodiment, for example, the testing device performs a variety of fault determination processes in step S5 after repeating the steps S1 to S4 to produce the attenuation constants with respect to each of the prescribed times. However, it is possible to modify the present embodiment such that the steps S1 to S5 are repeatedly performed. That is, every time the attenuation constants are calculated every prescribed time, the testing device performs a variety of fault determination processes in step S5 by comparing the attenuation constants calculated at the present time with the previous attenuation constants which have been calculated at the previous time. In that case, it is possible to perform a variety of fault determination processes substantially in real time.

Incidentally, the present embodiment is designed to deal with the optical network of four-branch type. Of course, a number of branches provided in the optical network applicable to this invention is not limited to four. In other words, this invention is capable of coping with the multi-branch optical network whose number of branches is arbitrarily selected.

Lastly, effects of this invention can be summarized as follows:

(1) It is possible to automatically detect the fault occurrence time, fault occurrence line and fault occurrence distance with respect to the multi-branch optical network in which a fault occurs on a certain branch optical fiber. So, different from the conventional technology, it is not required to locate the filters at the different positions on the lines respectively when measurement is performed to determine the fault line. Therefore, it is possible to engage measurement work with a high efficiency.

(2) The multi-branch optical network testing device is designed such that the same measurement operations are performed normally. So, as compared with the manual operation that the human operator manually performs the measurement, it is possible to perform the measurement with high objectivity and reliability. As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A multi-branch optical network testing method comprising the steps of:

inputting optical pulses to a branch point at which a multi-branch optical network branches off by a plurality of optical lines;

receiving response beams corresponding to mixture of reflection beams which are produced by reflecting the optical beams at selected portions of the optical lines respectively;

performing logarithmic conversion on waveform data corresponding to electric signals, which are produced by converting the response beams;

performing calculations on the logarithmically-converted waveform data to produce an approximation line;

comparing the logarithmically-converted waveform data with the approximation line to detect Fresnel reflection points on the waveform data;

using the Fresnel reflection points as split points to split the waveform data to a number of ranges;

performing separative analysis on each of the ranges to calculate attenuation constants with respect to each of the optical lines;

storing the attenuation constants in a storage device in connection with each of measurement times; and determining a fault occurrence time, a fault occurrence line and a fault occurrence distance with respect to a fault that occurs in the multi-branch optical network having the optical lines on the basis of the attenuation constants which are repeatedly calculated every prescribed time and stored in the storage device.

2. A multi-branch optical network testing method according to claim 1, wherein the logarithmic conversion is performed in accordance with an equation of $$Y_n = 5 \log(x_n)$$

where $x_n$ represents the waveform data while $y_n$ represents the logarithmically-converted waveform data.

3. A multi-branch optical network testing method according to claim 1 or 2, wherein the Fresnel reflection points are detected based on points of intersection formed between a waveform corresponding to the logarithmically-converted waveform data and the approximation line.

4. A multi-branch optical network testing method according to claims 1 or 2, wherein comparison is performed on the attenuation constants sequentially calculated at consecutive measurement times so that fault occurrence is determined in response to a change that is detected between the attenuation constants, and wherein the measurement time corresponding to the change of the attenuation constants is determined as the fault occurrence time, distance of a reflection peak is detected from the attenuation constants so that an optical line corresponding a change that occurs on the distance of the reflection peak is determined as the fault occurrence line, and the distance of the reflection peak after the change is determined as the fault occurrence distance.

5. A multi-branch optical network testing device comprising:

light emitting means for emitting optical pulses input to a branch point at which a multi-branch optical network branches off by a plurality of optical lines;

light receiving means for receiving response beams corresponding to mixture of reflection beams which are produced by reflecting the optical beams at selected portions of the optical lines respectively;

conversion means for performing logarithmic conversion on waveform data corresponding to electric signals, which are produced by converting the response beams;

approximation means for performing calculations on the logarithmically-converted waveform data to produce an approximation line;

comparison means for comparing the logarithmically-converted waveform data with the approximation line to detect Fresnel reflection points on the waveform data;

split means for using the Fresnel reflection points as split points to split the waveform data to a number of ranges;

analysis means for performing separative analysis on each of the ranges to calculate attenuation constants with respect to each of the optical lines;

write means for storing the attenuation constants in a storage device in connection with each of measurement times; and determination means for determining a fault occurrence time, a fault occurrence line and a fault occurrence distance with respect to a fault that occurs in the multi-branch optical network having the optical lines on the basis of the attenuation constants which are repeatedly calculated every prescribed time and stored in the storage device.

6. A multi-branch optical network testing device according to claim 5, wherein the conversion means performs the logarithmic conversion in accordance with an equation of $$y_n = 5 \log(x_n)$$

where $x_n$ represents the waveform data while $y_n$ represents the logarithmically-converted waveform data.

7. A multi-branch optical network testing device according to claim 5 or 6, wherein the Fresnel reflection points are detected based on points of intersection formed between a waveform corresponding to the logarithmically-converted waveform data and the approximation line.

8. A multi-branch optical network testing device according to claims 5 or 6, wherein the determination means performs comparison on the attenuation constants sequentially calculated at consecutive measurement times so that fault occurrence is determined in response to a change that is detected between the attenuation constants, and wherein the measurement time corresponding to the change of the attenuation constants is determined as the fault occurrence time, distance of a reflection peak is detected from the attenuation constants so that an optical line corresponding a change that occurs on the distance of the reflection peak is determined as the fault occurrence line, and the distance of the reflection peak after the change is determined as the fault occurrence distance.

9. A multi-branch optical network testing method comprising the steps of:

inputting optical pulses to an optical network that branches off using an optical coupler by a plurality of optical lines having terminal ends respectively, wherein the optical pulses are reflected by the optical coupler as well as in the plurality of optical lines respectively so that reflection beams are produced;

receiving response beams corresponding to mixture of the reflection beams from the optical coupler;

converting the response beams to electric signals to produce OTDR waveform data representing a waveform whose optical power gradually decreases in accordance with a distance and which has reflection peaks in response to the optical coupler and the terminal ends of the plurality of optical lines respectively;

performing logarithmic conversion on the OTDR waveform data to produce logarithmic waveform data representing a logarithmic waveform having peaks corresponding to the reflection peaks of the waveform of the OTDR waveform data;

effecting an approximation method of least squares on the logarithmic waveform data to produce an approximation line which crosses the logarithmic waveform at points of intersection that correspond to Fresnel reflection points;

using the Fresnel reflection points as split points to split the logarithmic waveform data into a plurality of ranges, a number of which is determined in connection with the plurality of optical lines;

calculating at least one attenuation constant with respect to each of the plurality of ranges, wherein calculation of the attenuation constant is repeated every measurement time so that attenuation constants are sequentially calculated with respect to each of the plurality of ranges;

storing the attenuation constants in a storage device; and performing fault determination with regard to the optical network on the basis of the attenuation constants stored in the storage device.

10. A multi-branch optical network testing method according to claim 9, wherein the logarithmic conversion is performed in accordance with an equation of $$y_n = 5 \log(x_n)$$

where $x_n$ represents the OTDR waveform data while $y_n$ represents the logarithmic waveform data.

11. A multi-branch optical network testing method according to claim 9 or 10, wherein occurrence of a fault is determined in response to a change that occurs between the attenuation constants sequentially calculated at consecutive measurement times with respect to each of the plurality of ranges.

12. A multi-branch optical network testing method according to claims 9 or 10, wherein the fault determination is performed with regard to a fault occurrence time, a fault occurrence line and a fault occurrence distance.

* * * * *